United States Patent
Suwabe et al.

(10) Patent No.: US 8,409,685 B2
(45) Date of Patent: Apr. 2, 2013

(54) OPTICAL RECORDING MEDIUM AND METHOD FOR MANUFACTURING THE SAME

(75) Inventors: Masatsugu Suwabe, Miyagi (JP); Hiroshi Nakayama, Miyagi (JP); Takahiro Igari, Miyagi (JP); Teruyuki Ota, Miyagi (JP)

(73) Assignee: Sony Corporation, Tokyo (JP)

( * ) Notice: Subject to any disclaimer, the term of this patent is extended or adjusted under 35 U.S.C. 154(b) by 349 days.

(21) Appl. No.: 12/662,505

(22) Filed: Apr. 21, 2010

(65) Prior Publication Data

US 2010/0291337 A1 Nov. 18, 2010

(30) Foreign Application Priority Data

May 18, 2009 (JP) .................. 2009-120427

(51) Int. Cl.
*B32B 3/02* (2006.01)
(52) U.S. Cl. .............. 428/64.1; 428/64.4; 430/270.11
(58) Field of Classification Search .......... 428/64.1; 430/270.11
See application file for complete search history.

(56) References Cited

U.S. PATENT DOCUMENTS

| | | | |
|---|---|---|---|
| 6,863,946 B2 * | 3/2005 | Hisada et al. | 428/64.1 |
| 6,967,049 B1 * | 11/2005 | Yamada et al. | 428/64.1 |
| 7,063,876 B2 * | 6/2006 | Nishihara et al. | 428/64.1 |
| 2005/0270961 A1 * | 12/2005 | Iida et al. | 369/272.1 |

FOREIGN PATENT DOCUMENTS

| | | |
|---|---|---|
| JP | 63-253549 A | 10/1988 |
| JP | 03-144937 | 6/1991 |
| JP | 04-019844 A | 1/1992 |
| JP | 09-251673 A | 9/1997 |
| JP | 10-289488 A | 10/1998 |
| JP | 2006-018926 | 1/2006 |
| JP | 2006-277828 A | 10/2006 |
| JP | 2008-305479 A | 12/2008 |

OTHER PUBLICATIONS

Japanese Office Action issued Aug. 28, 2012 for corresponding Japanese Application No. 2009-120427.

* cited by examiner

*Primary Examiner* — Elizabeth Mulvaney
(74) *Attorney, Agent, or Firm* — Rader, Fishman & Grauer PLLC

(57) ABSTRACT

An optical recording medium includes: a substrate having a first principal surface and a second principal surface; one or plural information signal layers formed on the first principal surface of the substrate for undergoing recording or reproduction of information signals upon irradiation with light; and a barrier layer formed on the second principal surface of the substrate for suppressing the gas release from the second principal surface of the substrate, wherein an area of a region exposing from the barrier layer of the second principal surface of the substrate is not more than 688 mm$^2$.

20 Claims, 11 Drawing Sheets

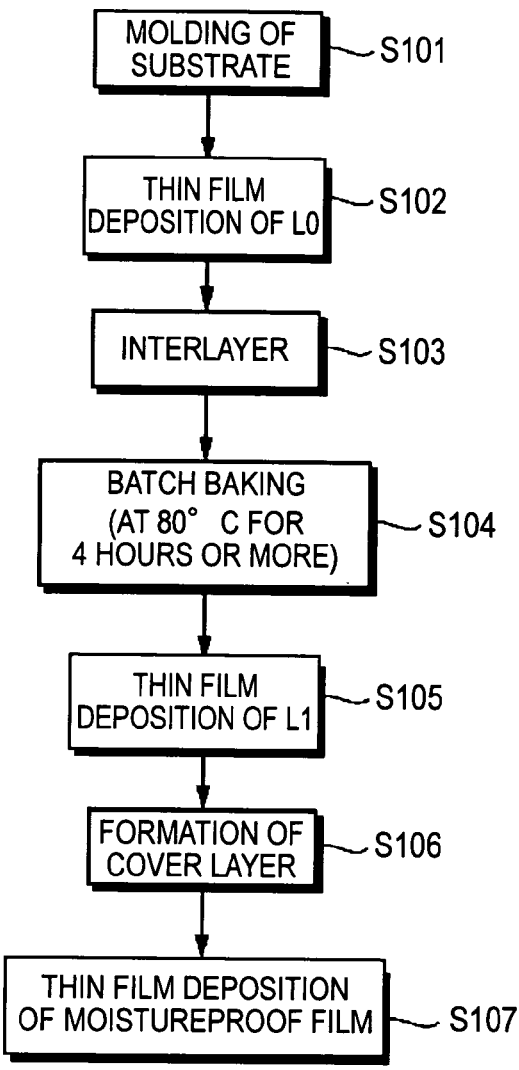
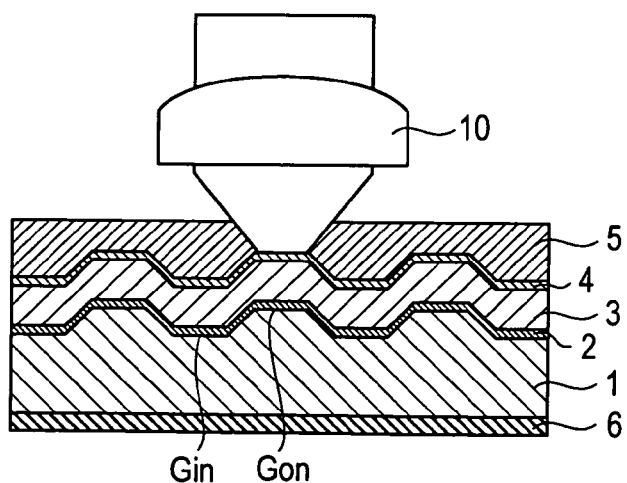

OPTICAL RECORDING MEDIUM AND METHOD FOR MANUFACTURING THE SAME

BACKGROUND OF THE INVENTION

1. Field of the Invention

The present invention relates to an optical recording medium and a method for manufacturing the same. In detail, the present invention relates to an optical recording medium for undergoing recording and/or reproduction of information signals upon irradiation with light.

2. Description of the Related Art

Rewritable optical recording media for undergoing reading or writing information signals upon irradiation with laser light on an information signal layer have hitherto widely spread. In general, for information recording layers used in rewritable Blu-ray Disc and the like, a phase-change recording material in which a reversible change occurs between a crystalline phase and an amorphous phase upon irradiation with laser light is used (see, for example, JP-A-2006-18926). In this phase-change recording material, it is possible to form the amorphous phase (recording mark) by sharply decreasing a temperature of a recording layer heated upon irradiation with laser light and to return the amorphous phase to the crystalline phase upon irradiation with laser light having a relatively small power for a relatively long time. For that reason, it is possible to undergo rewriting of plural times.

SUMMARY OF THE INVENTION

However, in the case where the number of times of recording increases, there is in general a tendency that thermal damage is accumulated in the phase-charge recording layer, a function to perform a reversible change between the crystalline phase and the amorphous phase is lost, and a reproduction characteristic of the recording mark is deteriorated. The degree of this deterioration is dependent upon a manufacturing condition. According to knowledge of the present inventors up to date, in the case where a degree of vacuum immediately before thin film deposition of the phase-change recording layer is relatively poor, it is understood that the foregoing deterioration becomes remarkable. For example, in double-layer Blu-ray Disc, since the time of from molding of the substrate until thin film deposition of an L1 layer becomes long by all means, and therefore, moisture is absorbed into a resin substrate and an interlayer formed of a UV-curable resin. When this absorbed moisture is released in a vacuum sputtering apparatus for thin film deposition of the L1 layer, a recording/reproduction characteristic of the L1 layer, particularly jitter after repeated rewriting is deteriorated. In order to suppress this influence, there may be considered a technique in which as shown in a flowchart of FIG. 1, a substrate having an L0 layer and an interlayer formed thereon is placed at a high temperature of 80° C. for a long period of time, and after moisture in the substrate and the interlayer is deaerated and dried, the resultant is charged into the vacuum sputtering apparatus for thin film deposition of an L1 layer. However, it takes a long time as 4 hours or more for the deaeration, and therefore, the productivity is remarkably lowered.

Accordingly, it is desirable to provide an optical recording medium capable of enhancing the durability against repeated recording without causing a lowering of the productivity and a method for manufacturing the same.

An embodiment according to the present invention is concerned with an optical recording medium including:

a substrate having a first principal surface and a second principal surface;

one or plural information signal layers formed on the first principal surface of the substrate for undergoing recording or reproduction of information signals upon irradiation with light; and a barrier layer formed on the second principal surface of the substrate for suppressing the gas release from the second principal surface of the substrate, wherein an area of a region exposing from the barrier layer of the second principal surface of the substrate is not more than 688 mm$^2$.

Another embodiment according to the present invention is concerned with a method for manufacturing an optical recording medium including the steps of:

molding a substrate having a first principal surface and a second principal surface;

forming a first information signal layer on the first principal surface of the substrate;

forming an interlayer on the first information signal layer;

forming a second information signal layer on the interlayer; and forming a barrier layer for suppressing the gas release from the second principal surface of the substrate on the second principal surface of the substrate after the step of molding the substrate but before the step of forming the second information signal layer, wherein in the step of forming the barrier layer, an area of a region exposing from the barrier layer of the second principal surface of the substrate is set to be not more than 688 mm$^2$.

In the embodiments according to the present invention, not only the barrier layer for suppressing the gas release on the second principal surface of the substrate is formed, but an area of the region exposing from the barrier layer of the second principal surface of the substrate is set to be not more than 688 mm$^2$. According to this, in forming the information signal recording layer, degassing within the substrate can be efficiently suppressed. For that reason, in forming the information signal layer, deterioration of a degree of vacuum to be caused due to impurity gases such as moisture can be suppressed. Accordingly, an information signal layer which is small in deterioration to be caused due to repeated recording can be obtained. That is, even when a deaeration treatment at a high temperature is not performed, an optical recording medium having excellent durability against repeated recording can be obtained.

As described previously, according to the embodiments of the present invention, excellent durability against repeated recording can be obtained without causing a lowering of the productivity.

BRIEF DESCRIPTION OF THE DRAWINGS

FIG. 1 is a flowchart for explaining a method for manufacturing an optical recording medium including a step of a deaeration treatment.

FIG. 2 is a diagrammatic sectional view showing a configuration example of an optical recording medium according to the first embodiment of the present invention.

DESCRIPTION OF THE PREFERRED EMBODIMENTS

Figure 3:
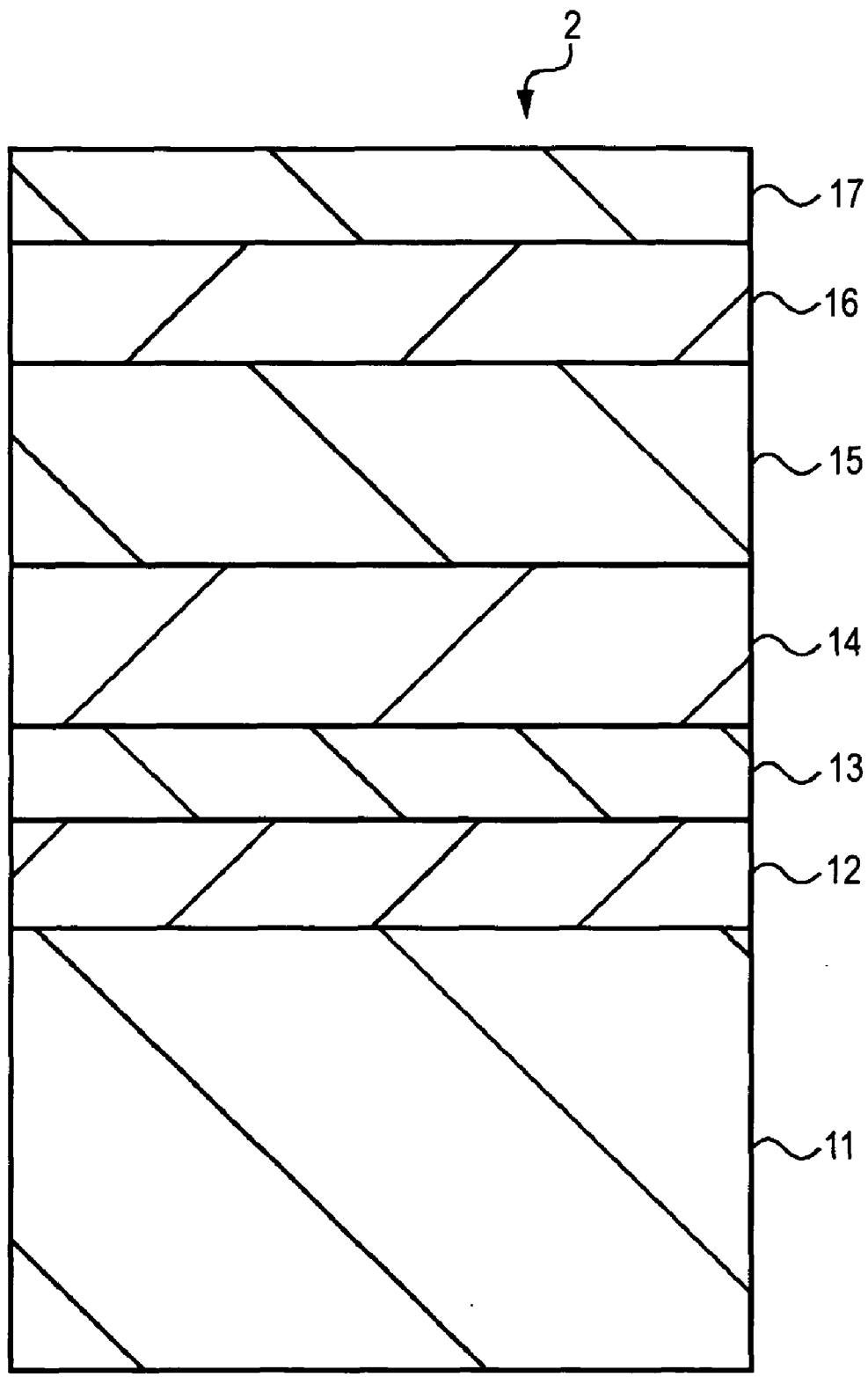
FIG. 3 is a diagrammatic sectional view showing a configuration example of a first information signal layer.

Embodiments according to the present invention are hereunder described in the following order by reference to the accompanying drawings. In all of the drawings of the following embodiments, the same symbols are given to the same or corresponding portions.

1. First Embodiment (example of double-layer optical recording medium)
2. Second Embodiment (example of single-layer optical recording medium)

1. First Embodiment

Configuration of Optical Recording Medium

FIG. 2 shows a configuration example of an optical recording medium according to the first embodiment of the present invention. This optical recording medium is a rewritable optical recording medium capable of erasing or rewriting data. As shown in FIG. 2, the optical recording medium includes a substrate 1; a first information signal layer (L0 layer) 2, an interlayer 3, a second information signal layer (L1 layer) 4 and a cover layer 5 laminated in this order on one principal surface (first principal surface) of the substrate 1; and a barrier layer 6 laminated on the other principal surface (second principal surface) of the substrate. Hereinafter, one principal surface of the substrate 1 on which the first information signal layer 2 and the second information signal layer 4 are laminated is properly referred to as "signal surface"; and the other principal surface on the opposite side thereto is properly referred to as "back surface".

In this optical recording medium, by irradiating laser light on the first information signal layer 2 or the second information signal layer 4 from the side of the cover layer 5, recording or reproduction of information signals is undergone. For example, laser light having a wavelength of from 400 nm to 410 nm is condensed by an objective lens having a numerical aperture of from 0.84 to 0.86 and irradiated on the first information signal layer 2 or the second information signal layer 4 from the side of the cover layer 5, whereby recording or reproduction of information signals is undergone. Examples of such an optical recording medium include BD-RE (Blu-ray Disk ReWritable).

This optical recording medium includes an incident surface on which laser light is made incident and a back surface on the opposite side to this incident surface. The second information signal layer 4 is disposed on the near side, and the first information signal layer 2 is disposed on the far side on the basis of the incident surface. The second information signal layer 4 is a translucent layer which is constituted such that the laser light irradiated on the first information signal layer 2 can be transmitted therethrough. Accordingly, recording or reproduction of information signals relative to the first information signal layer 2 is undergone by irradiating the laser light which has been transmitted through the second information signal layer 4 on the first information signal layer 2.

Hereinafter, the substrate 1, the first information signal layer 2, the interlayer 3, the second information signal layer 4, the cover layer 5 and the barrier layer 6 each constituting the optical recording medium are successively described.

(Substrate)

The substrate 1 has an annular shape having an opening formed in the center thereof (the opening will be hereinafter referred to as "center hole"). One principal surface of this substrate 1 forms, for example, a concave and convex surface, and the first information signal layer 2 is subjected to thin film deposition on this concave and convex surface. Hereinafter, the concave of the concave and convex surface is referred to as an in-groove Gin, and the convex of the concave and convex surface is referred to as an on-groove Gon.

Examples of the shape of each of the in-groove Gin and the on-groove Gon include a variety of shapes such as a spiral shape and a concentric shape. Also, the in-groove Gin and/or the on-groove Gon is, for example, wobbled for the purpose of adding address information.

A diameter of the substrate 1 is, for example, chosen to be 120 mm. A thickness of the substrate 1 is chosen while taking into consideration the rigidity; it is preferably chosen within the range of 0.3 mm or more and not more than 1.3 mm, and more preferably within the range of 0.6 mm or more and not more than 1.3 mm; and it is, for example, chosen to be 1.1 mm. Also, a diameter of the center hole is, for example, chosen to be 15 mm.

The substrate 1 contains, for example, a plastic resin material having water absorption properties as a main component. Examples of the material of the substrate 1 which can be used include resins materials such as polycarbonate based resins and acrylic resins.

(First Information Signal Layer)

FIG. 3 shows a configuration example of the first information signal layer. As shown in FIG. 3, the first information signal layer 2 is, for example, a laminated film obtained by laminating a reflecting layer 11, a second dielectric layer 12, a first dielectric layer 13, a recording layer 14, a first dielectric layer 15, a second dielectric layer 16 and a third dielectric layer 17 in this order on the substrate 1.

Examples of a material constituting the reflecting layer 11 include simple substances such as Al, Ag, Au, Ni, Cr, Ti, Pd, Co, Si, Ta, W, Mo and Ge; and alloys composed mainly of such a simple substance. Of these, Al based, Ag based, Au based, Si based and Ge based materials are especially preferable from the standpoint of practicality. Examples of the alloy which can be suitably used include Al—Ti, Al—Cr, Al—Cu, Al—Mg—Si, Ag—Nd—Cu, Ag—Pd—Cu, Ag—Pb—Ti and Si—B. It is preferable to set up the material constituting the reflecting layer 11 among these materials while taking into consideration the optical characteristic and thermal characteristic. For example, taking into consideration a point that a high reflectance is revealed even in a single wavelength region, it is preferable to use an Al based or Ag based material.

Each of the first dielectric layer 13, the second dielectric layer 12, the first dielectric layer 15, the second dielectric layer 16 and the third dielectric layer 17 is a layer for protecting the recording layer 14 and also controlling the optical characteristic and thermal characteristic or the like. As a dielectric material constituting such a dielectric layer, oxides of, for example, Si, In, Zr, Cr, Sn, Ta, Al, Nb or the like; nitrides of Si, Al or the like; sulfides of Zn or the like; or mixtures of two or more kinds of these dielectric materials can be used. Specific examples of the dielectric material which can be used include SiN, ZnS—$SiO_2$, AlN, $Al_2O_3$, $SiO_2$, $Cr_2O_3$, $In_2O_3$, $ZrO_2$, $SiO_2$—$In_2O_3$—$ZrO_2$ (hereinafter properly referred to as "SIZ"), $SiO_2$—$Cr_2O_3$—$ZrO_2$ (hereinafter properly referred to as "SCZ"), $TiO_2$ and $Nb_2O_5$. The first dielectric layer 13 and the first dielectric layer 15 may be constituted of a different material from each other. Also, the second dielectric layer 12 and the second dielectric layer 16 may be constituted of a different material from each other.

The recording layer 14 is, for example, a recording layer capable of repeatedly recording information signals upon irradiation with laser light. Specifically, the recording layer 14 is, for example, a phase-change recording layer in which recording and rewriting of information signals are undergone by performing a reversible change between a crystalline phase and an amorphous phase upon irradiation with laser light. Examples of a material which can be used for this phase-change recording layer include eutectic phase-change materials and compound based phase-change materials. Specific examples of the phase-change material include phase-change materials composed mainly of GeSbTe, SbTe, BiGeTe, BiGeSbTe, AgInSbTe, GeSnSbTe or the like. If desired, one or more kinds of metal materials such as Ag, In, Cr and Mn may be added to the phase-change material composed mainly of the foregoing materials.

(Interlayer)

On the first information signal layer 2 formed on the substrate 1, for example, the interlayer 3 is formed as a resin layer having a thickness of 25 μm. This interlayer 3 contains, for example, a resin material having transparency and water absorption properties as a main component. Examples of such a resin material which can be used include plastic materials such as polycarbonate based materials, polyolefin based materials and acrylic resins. The surface of the interlayer 3 located on the side of the cover layer 5 is, for example, a concave and convex surface composed of an in-groove Gin and an on-groove Gon similar to the substrate 1. The second information signal layer 4 is subjected to thin film deposition on this concave and convex surface.

Examples of the shape of each of the concave in-groove Gin and the convex on-groove Gon include a variety of shapes such as a spiral shape and a concentric shape. Also, the in-groove Gin and/or the on-groove Gon is, for example, wobbled for the purpose of adding address information.

(Second Information Signal Layer)

Figure 4:
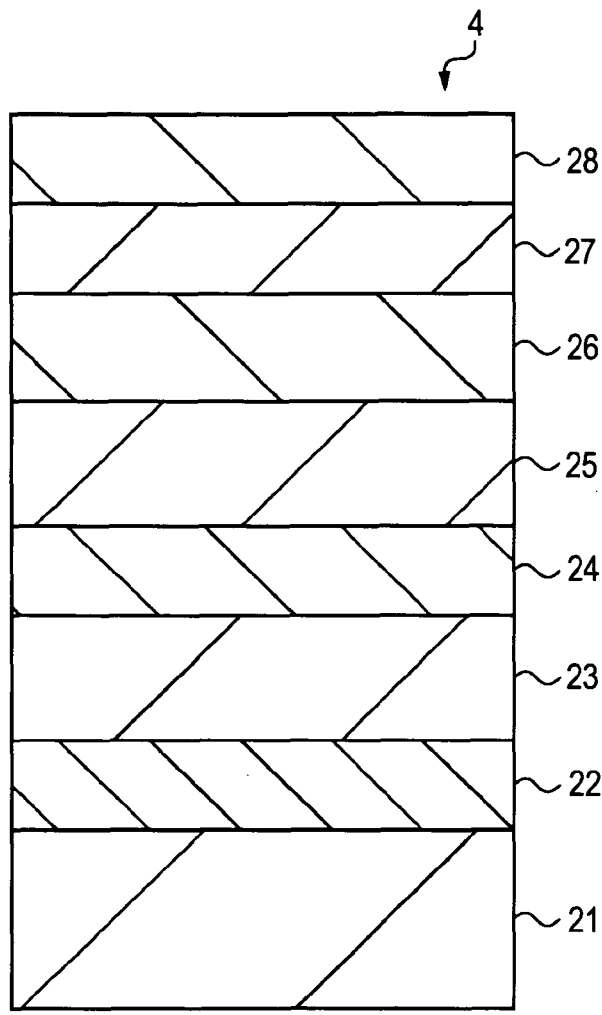
FIG. 4 is a diagrammatic sectional view showing a configuration example of a second information signal layer.

FIG. 4 shows a configuration example of the second information signal layer. As shown in FIG. 4, the second information signal layer 4 is, for example, a laminated film obtained by laminating a transmittance adjusting layer 21, a reflecting layer 22, a second dielectric layer 23, a first dielectric layer 24, a recording layer 25, a first dielectric layer 26, a second dielectric layer 27 and a third dielectric layer 28 in this order on the interlayer 3.

The transmittance adjusting layer 21 is a layer for amplifying a transmittance of the second information signal layer 4. Examples of a material constituting the transmittance adjusting layer 21, which can be used, include high refractive index materials such as $TiO_2$ and $Nb_2O_5$.

The reflecting layer 22 is a layer for reflecting the incident laser light to enhance the optical characteristic and also rapidly dissipating heat absorbed on the recording layer 25. Examples of a material constituting the reflecting layer 22 include simple substances such as Al, Ag, Au, Ni, Cr, Ti, Pd, Co, Si, Ta, W, Mo and Ge; and alloys composed mainly of such a simple substance. Of these, Al based, Ag based, Au based, Si based and Ge based materials are especially preferable from the standpoint of practicality. Examples of the alloy which can be suitably used include Al—Ti, Al—Cr, Al—Cu, Al—Mg—Si, Ag—Pd—Cu, Ag—Pb—Ti and Si—B. It is preferable to set up the material constituting the reflecting layer 22 among these materials while taking into consideration the optical characteristic and thermal characteristic. For example, taking into consideration a point that a high reflectance is revealed even in a single wavelength region, it is preferable to use an Al based or Ag based material.

Each of the first dielectric layer 24, the second dielectric layer 23, the first dielectric layer 26, the second dielectric layer 27 and the third dielectric layer 28 is a layer for protecting the recording layer 25 and also controlling the optical characteristic and thermal characteristic or the like. As a dielectric material constituting such a dielectric layer, oxides of, for example, Si, In, Zr, Cr, Sn, Ta, Al, Nb or the like; nitrides of Si, Al or the like; sulfides of Zn or the like; or mixtures of two or more kinds of these dielectric materials can be used. Specific examples of the dielectric material which can be used include SiN, ZnS—$SiO_2$, AlN, $Al_2O_3$, $SiO_2$, $Cr_2O_3$, $In_2O_3$, $ZrO_2$, SCZ, SIZ, $TiO_2$ and $Nb_2O_5$. The first dielectric layer 24 and the first dielectric layer 26 may be constituted of a different material from each other. Also, the second dielectric layer 23 and the second dielectric layer 27 may be constituted of a different material from each other.

It is preferable that a thermal conductivity of the second dielectric layer 23 adjacent to the reflecting layer 22 is set up high as compared with a thermal conductivity of the first dielectric layer 24 adjacent to the recording layer 25. According to this, it becomes possible to rapidly dissipate heat of the recording layer 25 heated upon irradiation with laser light toward the reflecting layer 22, whereby the durability against repeated recording of the second information signal layer 4 can be enhanced. In the case where each of the first dielectric layer 24 and the second dielectric layer 23 is composed mainly of $SiO_2$, $In_2O_3$ and $ZrO_2$, it is preferable that a ratio of $In_2O_3$ contained in each of the dielectric layers is satisfied with the following relation. That is, when a ratio of $In_2O_3$ contained in the first dielectric layer 24 adjacent to the recording layer 25 is defined as a (mol %), and a ratio of $In_2O_3$ contained in the second dielectric layer 23 adjacent to the reflecting layer 22 is defined as b (mol %), it is preferable that a relation of (a<b) is satisfied. When such a relation is satisfied, the thermal conductivity of the second dielectric layer 23 can be set up high as compared with the thermal conductivity of the first dielectric layer 24. Here, the ratio is based on 100 mol % of the total sum of $SiO_2$, $In_2O_3$ and $ZrO_2$ contained in the first dielectric layer 24 or the second dielectric layer 23. Here, the thermal conductivity is a thermal conductivity in a thickness direction of the thin film.

Specifically, in the case where each of the first dielectric layer 24 and the second dielectric layer 23 is composed mainly of $SiO_2$, $In_2O_3$ and $ZrO_2$, it is preferable that the first dielectric layer 24 has a composition represented by the following formula (1); and that the second dielectric layer 23 has a composition represented by the following formula (2).

$$(SiO_2)_{x1}(In_2O_3)_{y1}(ZrO_2)_{z1} \quad (1)$$

In the formula (1), $(x1+y1+z1)=100$, $5 \leq x1 \leq 20$, $40 \leq y1 \leq 60$ and $30 \leq z1 \leq 50$.

$$(SiO_2)_{x2}(In_2O_3)_{y2}(ZrO_2)_{z2} \quad (2)$$

In the formula (2), $(x2+y2+z2)=100$, $5 \leq x2 \leq 20$, $60 \leq y2 \leq 90$ and $5 \leq z2 \leq 20$.

The recording layer 25 is, for example, a recording layer capable of repeatedly recording information signals upon irradiation with laser light. Specifically, the recording layer 25 is, for example, a phase-change recording layer in which recording and rewriting of information signals are undergone by performing a reversible change between a crystalline phase and an amorphous phase upon irradiation with laser light. Examples of a material which can be used for this phase-change recording layer include eutectic phase-change materials and compound based phase-change materials. Specific examples of the phase-change material include phase-change materials composed mainly of GeSbTe, SbTe, BiGeTe, BiGeSbTe, AgInSbTe, GeSnSbTe or the like. If desired, one or more kinds of metal materials such as Ag, In, Cr and Mn may be added to the phase-change material composed mainly of the foregoing materials.

It is preferable to use a phase-change recording layer composed mainly of a eutectic phase-change material as the recording layer 14 of the first information signal layer 2 and to use a compound based phase-change material as the recording layer 25 of the second information signal layer 4. In the case where such a configuration is taken, it is preferable to use a GeSbTe based material as the eutectic phase-change material and to use a BiGeTe based material as the compound based material. This is because by combining the recording layer 14 and the recording layer 25 having such a configuration, respectively, the recording characteristic can be enhanced.

The BiGeTe based material which is the compound based phase-change material is preferably one having a composition represented by the following formula (3).

$$Bi_xGe_yTe_z \quad (3)$$

In the formula (3), $(x+y+z)=100$, $2 \leq x \leq 10$, $35 \leq y \leq 45$ and $45 \leq z \leq 55$.

(Cover Layer)

The cover layer 5 which is a protective layer is a resin layer obtained by curing a photosensitive resin, for example, an ultraviolet ray-curable resin or the like. Examples of a material of this resin layer include ultraviolet ray-curable acrylic resins. Also, the cover layer 5 may be configured to include a light-transmitting sheet having an annular shape and an adhesive layer for sticking this light-transmitting sheet to the substrate 1. It is preferable that the light-transmitting sheet is made of a material having a low absorptive power relative to the laser light which is used for recording and reproduction. Specifically, it is preferable that the light-transmitting sheet is made of a material having a transmittance of 90% or more. Examples of the material of the light-transmitting sheet include polycarbonate resin materials and polyolefin based resins (for example, ZEONEX (a registered trademark)). A thickness of the light-transmitting sheet is preferably chosen to be not more than 0.3 mm, and it is more preferably chosen within the range of from 3 μm to 177 μm. The adhesive layer is, for example, made of an ultraviolet ray-curable resin or a pressure sensitive adhesive (PSA).

A thickness of the cover layer 5 is preferably chosen within the range of from 10 μm to 177 μm, and it is, for example, chosen to be 100 μm. By combining such a thin cover layer 5 with an objective lens having a high numerical aperture (NA) of, for example, about 0.85, high-density recording can be realized.

(Barrier Layer)

The barrier layer 6 is one for suppressing the degassing (moisture release) from the back surface of the substrate 1 in the thin film deposition step. Also, the barrier layer 6 functions as a moistureproof layer for suppressing the absorption of moisture on the back surface of the substrate 1.

A material constituting the barrier layer 6 is not particularly limited so far as it is able to suppress the degassing (moisture release) from the back surface of the substrate 1. Examples of the material which can be used include dielectric materials having low gas transmission properties. For example, at least one member selected from the group consisting of SiN, $SiO_2$, TiN, AlN and ZnS—$SiO_2$ can be used as such a dielectric material. A water transmission rate of the barrier layer 6 is preferably not more than $5 \times 10^{-5}$ g/cm$^2$·day. A thickness of the barrier layer 6 is preferably set to be 5 nm or more and not more than 40 nm. This is because when the thickness of the barrier layer 6 is less than 5 nm, the barrier function to suppress the degassing from the back surface of the substrate 1 tends to be lowered; and on the other hand, when the thickness of the barrier layer 6 exceeds 40 nm, the barrier function to suppress the degassing is not substantially different from that in the case where the film thickness is not more than 40 nm, and the productivity tends to be lowered.

Figure 5:
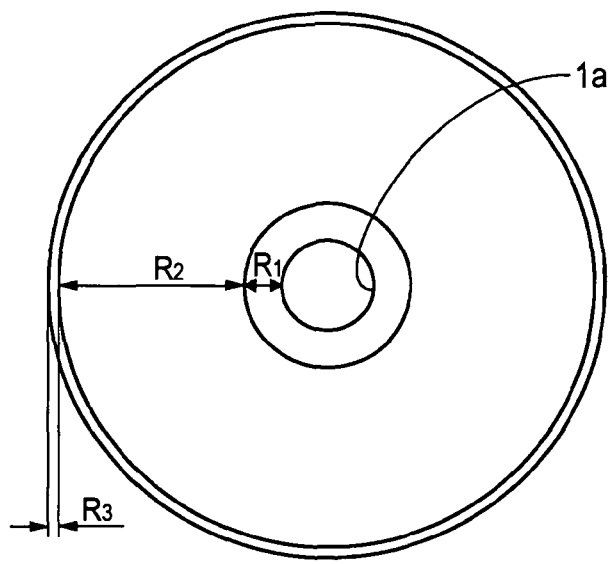
FIG. 5 is a plan view showing a thin film deposition area of a battier layer formed on a back surface of a substrate.

FIG. 5 is a plan view showing a thin film deposition area of the battier layer formed on the back surface of the substrate. As described previously, a center hole 1a is formed in the center of the substrate 1. A substrate exposed area $R_1$ on the inner peripheral side, a thin film deposition area $R_2$ of the barrier layer 6 and a substrate exposed area $R_3$ on the outer peripheral side are set up on the back surface of the substrate 1 from the inner periphery toward the outer periphery of the substrate 1. In a thin film deposition step of the barrier layer 6 as described later, an area of the thin film deposition area $R_2$ of the barrier layer 6 is adjusted by an inner peripheral mask and an outer peripheral mask covering an inner peripheral part and an outer peripheral part of the substrate 1, respectively. By covering the inner peripheral part and the outer peripheral part of the substrate 1 by these inner peripheral mask and outer peripheral mask, respectively, the barrier layer 6 is not formed, but the substrate exposed area $R_1$ on the inner peripheral side and the substrate exposed area $R_3$ on the outer peripheral side, in each of which the substrate 1 is exposed, are formed.

An area of the exposed area on the back surface of the substrate 1 (namely, an area of the total sum of the substrate exposed area $R_1$ on the inner peripheral side and the substrate exposed area $R_3$ on the outer peripheral side) is not more than 688 mm$^2$, and preferably not more than 398.2 mm$^2$. According to this, a lowering of the degree of vacuum at the time of thin film deposition of the second information signal layer 4, specifically the recording layer 25 of the second information signal layer 4 can be suppressed, and a lowering of the reproduction characteristic after the recording of many times can be suppressed.

[Manufacturing Method of Optical Recording Medium]

Figure 6:
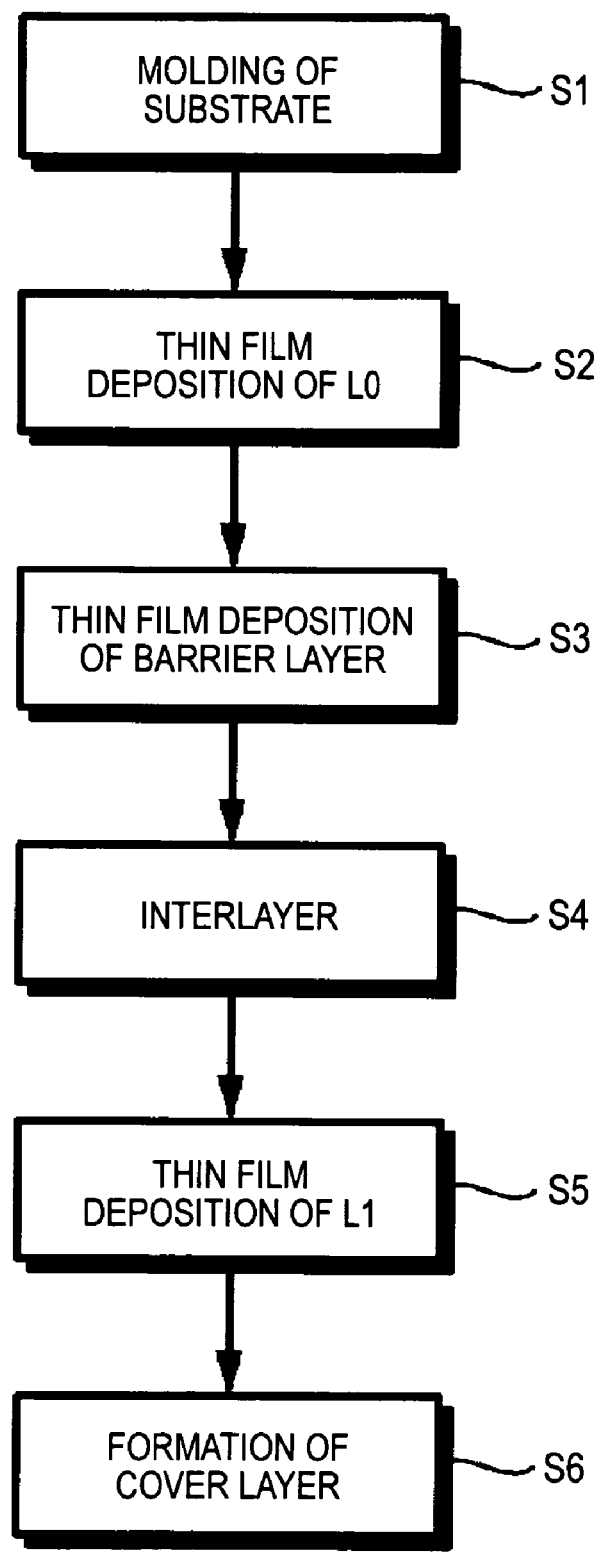
FIG. 6 is a flowchart for explaining an example of a method for manufacturing an optical recording medium according to the first embodiment of the present invention.

Next, an example of a method for manufacturing the optical recording medium having the foregoing configuration is described by reference to FIG. 6.

First of all, in Step S1, the substrate 1 is molded by a molding apparatus, for example, an injection molding apparatus or the like. Subsequently, the molded substrate is conveyed into an L0 layer thin film deposition apparatus from the molding apparatus. Subsequently, in Step S2, the first information signal layer 2 is formed by the L0 layer thin film deposition apparatus. This L0 layer thin film deposition apparatus is preferably a single thin film deposition apparatus. This is because the reflecting layer 11, the second dielectric layer 12, the first dielectric layer 13, the recording layer 14, the first dielectric layer 15, the second dielectric layer 16 and the third dielectric layer 17 can be continuously laminated in this order on the substrate 1 without breaking the vacuum by using each of vacuum chambers of this single thin film deposition apparatus. As the single thin film deposition apparatus, those to which a vacuum thin film forming technology, for example, a sputtering method, a vacuum vapor deposition method or the like is applied can be used. Subsequently, the substrate 1 having the first information signal layer 2 formed thereon is conveyed into a barrier layer thin film deposition apparatus from the L0 layer thin film deposition apparatus.

Figure 7:
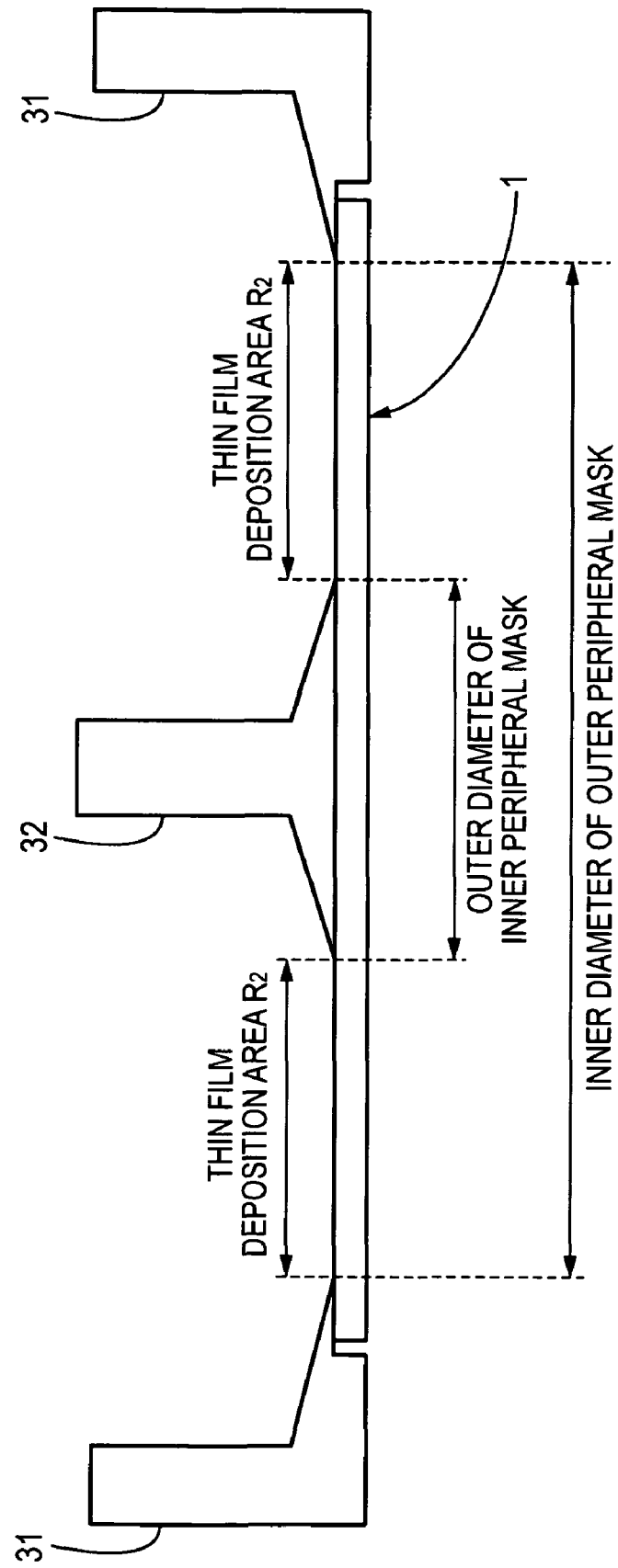
FIG. 7 is a diagrammatic view showing an example of disposition of an outer peripheral mask 31 and an inner peripheral mask 32.

Subsequently, in Step S3, as shown in FIG. 7, the outer peripheral part and the inner peripheral part on the back surface of the substrate 1 are covered by an outer peripheral mask 31 and an inner peripheral mask 32, respectively by a barrier layer thin film deposition apparatus, thereby forming the barrier layer 6 on the back surface of the substrate 1. As the barrier layer thin film deposition apparatus, those to which a vacuum thin film forming technology, for example, a sputtering method, a vacuum vapor deposition method or the like is applied can be adopted. As an integrated apparatus of the L0 layer thin film deposition apparatus and the barrier layer thin film deposition apparatus, the first information signal layer 2 and the barrier layer 6 may be subjected to continuous thin film deposition within one thin film deposition apparatus. Subsequently, the substrate 1 having the barrier layer 6 formed thereon is conveyed into an interlayer forming apparatus from the barrier layer thin film deposition apparatus.

Subsequently, in Step S4, an ultraviolet ray-curable resin is uniformly coated on the first information signal layer 2 by an interlayer forming apparatus by, for example, a spin coating method. Thereafter, a concave and convex pattern of a stamper is pressed against the ultraviolet ray-curable resin uniformly coated on the first information signal layer 2, the ultraviolet ray-curable resin is cured upon irradiation with UV rays, and the stamper is then separated. According to this, the concave and convex pattern of the stamper is transferred onto the ultraviolet ray-curable resin, whereby the interlayer 3 provided with, for example, the in-groove Gin and the on-groove Gon is formed. Subsequently, the substrate 1 having the interlayer 3 formed thereon is conveyed into an L1 layer thin film deposition apparatus from the interlayer forming apparatus. It is desirable to adjust a dew point of a conveyance section of from the interlayer forming apparatus to the L1 layer thin film deposition apparatus preferably at not higher than −5° C., and more preferably at not higher than −15° C. According to this, in the conveying step of from the interlayer forming apparatus to the L1 layer thin film deposition apparatus, the absorption of moisture onto the interlayer 3 can be suppressed, and in each of vacuum chambers of the L1 layer thin film deposition apparatus, for example, a vacuum chamber for forming the recording layer 25, the degassing (moisture release) from the interlayer 3 can be suppressed. Accordingly, during the thin film deposition of the recording layer 25, the degree of vacuum can be kept well. According to this, the recording layer 25 which is small in the deterioration to be caused due to repeated recording can be formed.

Subsequently, in Step S5, the second information signal layer 4 is formed on the interlayer 3 by the L1 layer thin film deposition apparatus. This L1 layer thin film deposition apparatus is preferably a single thin film deposition apparatus. This is because, for example, the transmittance adjusting layer 21, the reflecting layer 22, the second dielectric layer 23, the first dielectric layer 24, the recording layer 25, the first dielectric layer 26, the second dielectric layer 27 and the third dielectric layer 28 can be continuously laminated on the interlayer 3 without breaking the vacuum by using each of vacuum chambers of this single thin film deposition apparatus. As the single thin film deposition apparatus, those to which a vacuum thin film forming technology, for example, a sputtering method, a vacuum vapor deposition method or the like is applied can be used. Subsequently, the substrate 1 having the L1 layer formed thereon is conveyed into a cover layer forming apparatus from the L1 layer thin film deposition apparatus.

Subsequently, in Step S6, the cover layer 5 which is a protective layer is formed on the second information signal layer 4 by the cover layer forming apparatus. As the cover layer forming apparatus, an apparatus in which a photosensitive resin, for example, an ultraviolet ray-curable resin or the like is spin coated on the second information signal layer 4, and light such as ultraviolet rays is irradiated on the photosensitive resin, thereby forming cover layer 5 can be used. Also, an apparatus in which a light-transmitting sheet is stuck to the side of the concave and convex surface on the substrate 1 using an adhesive, thereby forming the cover layer 5 can be used. Specifically, for example, an apparatus in which a light-transmitting sheet to the side of the concave and convex surface is stuck on the substrate 1 using a photosensitive resin such as an ultraviolet ray-curable resin coated on the second information signal layer 4, thereby forming the cover layer 5 can be used. Also, an apparatus in which a light-transmitting sheet to the side of the concave and convex surface is stuck on the substrate 1 using a pressure sensitive adhesive (PSA) uniformly coated in advance on a principal surface of this sheet, thereby forming the cover layer 5 can be used.

The optical recording medium shown in FIG. 2 is obtained through the foregoing steps.

As described previously, in the first embodiment according to the present invention, the barrier layer 6 is formed on the back surface of the substrate 1, and an area of a portion exposing from the barrier layer 6 of the back surface of the substrate 1 is set to be not more than 688 mm$^2$, and preferably not more than 398.2 mm$^2$. According to this, the degassing from the back surface of the substrate 1 can be suppressed. For that reason, during the thin film deposition of the recording layer 25, the degree of vacuum is not deteriorated by impurity gases such as moisture, and an information signal layer which is small in deterioration to be caused due to repeated recording can be formed. That is, the durability against repeated recording of the optical recording medium can be enhanced.

Also, it is desirable to adjust a dew point of a conveyance section of from the interlayer forming apparatus to the L1 layer thin film deposition apparatus preferably at not higher than −5° C., and more preferably at not higher than −15° C. According to this, in the conveying step of from the interlayer forming apparatus into the L1 layer thin film deposition apparatus, the absorption of moisture onto the interlayer 3 can be suppressed, and in the L1 layer thin film deposition apparatus, the degassing (moisture release) from the interlayer 3 can be suppressed. Accordingly, the degree of vacuum during the thin film deposition of the recording layer 25 can be kept well in each of vacuum chambers of the L1 layer thin film deposition apparatus. Thus, the durability against repeated recording of the optical recording medium can be more enhanced.

Also, it is preferable that a thermal conductivity of the second dielectric layer 23 adjacent to the reflecting layer 22 is set up high as compared with a thermal conductivity of the first dielectric layer 24 adjacent to the recording layer 25. According to this, it becomes possible to rapidly dissipate heat of the recording layer 25 heated upon irradiation with laser light toward the reflecting layer 22, whereby the durability against repeated recording of the second information signal layer 4 can be enhanced. That is, in a multilayered rewritable optical recording medium, the durability against repeated recording can be enhanced.

Also, even in the case of making the film thickness of the reflecting layer 22 thin for the purpose of controlling a transmittance of laser light which is transmitted through the second information signal layer 4, it is possible to rapidly dissipate heat of the recording layer 25 heated upon irradiation with laser light toward the reflecting layer 22. Accordingly, in a multilayered rewritable optical recording medium, the durability against repeated recording can be enhanced.

Also, in the case of using the first dielectric layer 24 and the second dielectric layer 23, each of which is composed mainly of $SiO_2$, $In_2O_3$ and $ZrO_2$, by adjusting a ratio of $In_2O_3$ in each of these two dielectric layers, it is possible to easily control a thermal conductivity of each of these two dielectric layers. Specifically, when a ratio of $In_2O_3$ in the first dielectric layer 24 adjacent to the recording layer 25 is defined as a (mol %), and a ratio of $In_2O_3$ in the second dielectric layer 23 adjacent to the reflecting layer 22 is defined as b (mol %), it is preferable to set up a and b such that a relation of (a<b) is satisfied. This is because by setting up a and b in this way, the thermal conductivity of the second dielectric layer 23 adjacent to the reflecting layer 22 can be set up higher than the thermal conductivity of the first dielectric layer 24 adjacent to the recording layer 25.

Also, it is preferable to use a dielectric layer composed mainly of $SiO_2$, $In_2O_3$ and $ZrO_2$ as each of the first dielectric layer 24 and the second dielectric layer 23 and to use a recording layer composed mainly of Bi, Ge and Te as the recording layer 25. According to this, the formation of a crystal of the recording layer 25 can be controlled, and a more favorable signal characteristic can be obtained.

2. Second Embodiment

Figure 8:
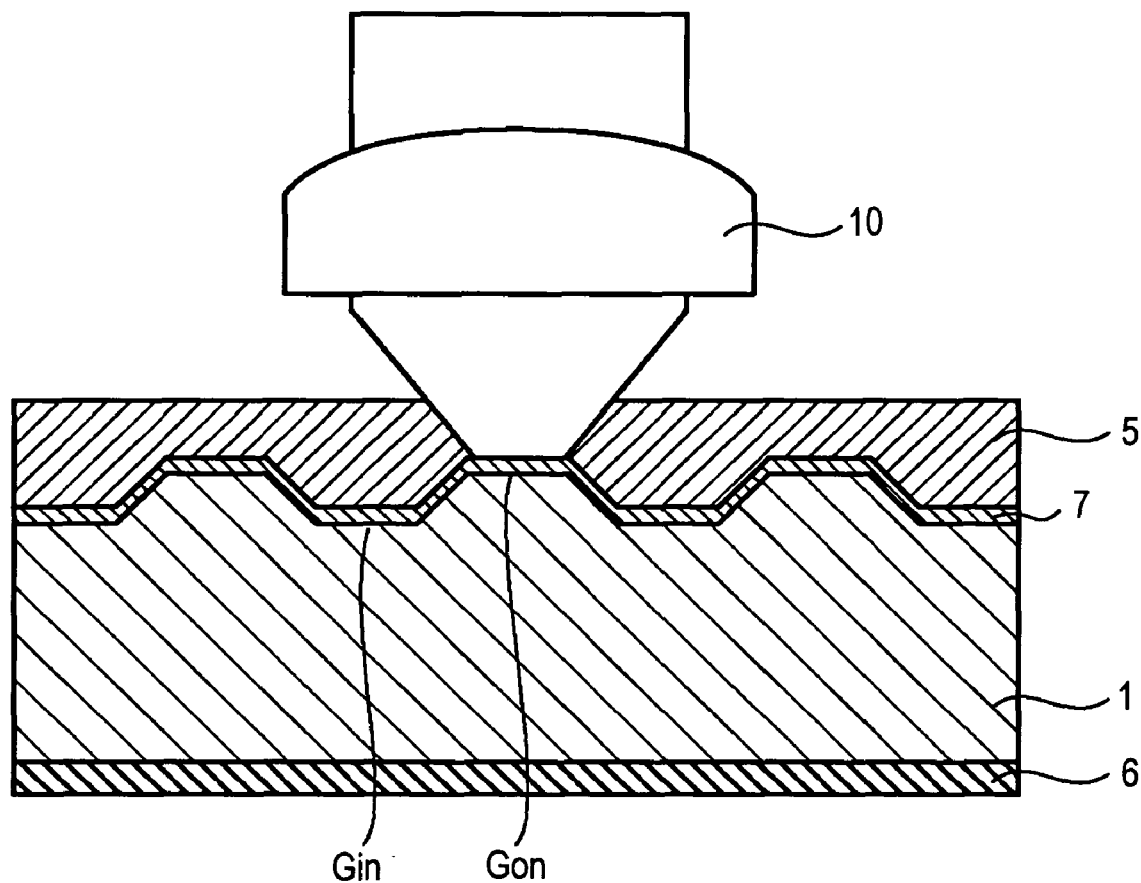
FIG. 8 is a diagrammatic sectional view showing a configuration example of an optical recording medium according to the second embodiment of the present invention.

FIG. 8 shows a configuration example of the optical recording medium according to the second embodiment of the present invention. As shown in FIG. 8, the optical recording medium according to the second embodiment is different from that of the first embodiment in the point that it includes a single-layer information signal layer 7. The same symbols are given to the same portions as those in the foregoing first embodiment, and their explanations are omitted. As the information signal layer 7, for example, the same layer as the first information signal layer 2 in the first embodiment can be used. In this second embodiment, the barrier layer 6 is, for example, formed after the step of molding the substrate 1 but before the step of forming the information signal layer 7.

According to this second embodiment, the durability against repeated recording can be enhanced in a single-layer rewritable optical recording medium.

EXAMPLES

The present invention is specifically described below with reference to the following Examples, but it should not be construed that the present invention is limited to only these Examples.

Example 1

First of all, a polycarbonate substrate having a diameter φ of 120 mm and a thickness of 1.1 mm and provided with grooves having a track pitch of 0.32 μm was molded by an injection molding apparatus. This polycarbonate substrate is in conformity with Blu-ray Disc Rewritable Format, Part 1: Basic Format Specifications Version 2.1. Subsequently, the molded substrate was conveyed into a first single sputtering apparatus (DVD SPRINTER, manufactured by Oerlikon) from the injection molding apparatus. Subsequently, a reflecting layer, a second dielectric layer, a first dielectric layer, a phase-change recording layer, a first dielectric layer and a second dielectric layer each having the following composition and film thickness were laminated in this order on the surface of the substrate in a magnetron sputtering mode. There was thus formed a first information signal layer (L0 layer) on the surface of the substrate.

Second dielectric layer: SiN, 40 nm
First dielectric layer: ZnS—$SiO_2$, 10 nm
Phase-change recording layer: GeSbTe, 12 nm
First dielectric layer: ZnS—$SiO_2$, 5 nm
Second dielectric layer: SiN, 5 nm
Reflecting layer: Ag alloy, 100 nm Subsequently, the substrate having the first information signal layer formed thereon was conveyed into a sputtering apparatus for forming a barrier layer from the first single sputtering apparatus. Subsequently, after an inner peripheral part and an outer peripheral part on the back surface of the substrate were covered by an inner peripheral mask having an inner diameter of 25 mm and an outer peripheral mask having an outer diameter of 118 mm, respectively, a 5 nm-thick barrier layer made of SiN was formed on the back surface of the substrate in a magnetron sputtering mode.

Subsequently, the substrate was conveyed out into an interlayer forming apparatus from the sputtering apparatus for forming a barrier layer, and an ultraviolet ray-curable resin was uniformly coated on the first information signal layer by a spin coating method. Thereafter, a concave and convex pattern of a stamper was pressed against the ultraviolet ray-curable resin uniformly coated on the first information signal layer, the ultraviolet ray-curable resin was cured upon irradiation with ultraviolet rays, and the stamper was then separated. There was thus formed an interlayer having a thickness of 25 μm and provided with grooves having a track pitch of 0.32 μm.

Subsequently, the substrate was conveyed into a second single sputtering apparatus (DVD SPRINTER, manufactured by Oerlikon) from the interlayer forming apparatus. Subsequently, a transmittance adjusting layer, a reflecting layer, a second dielectric layer, a first dielectric layer, a phase-change recording layer, a first dielectric layer, a second dielectric layer and a third dielectric layer each having the following composition and film thickness were laminated in this order on the interlayer in a magnetron sputtering mode. There was thus formed a second information signal layer on the interlayer.

Third dielectric layer: SiN, 30 nm
Second dielectric layer: ZnS—$SiO_2$, 10 nm
First dielectric layer: $SiO_2$—$Cr_2O_3$—$ZrO_2$, 2 nm
Phase-change recording layer: $Bi_8Ge_{40}Te_{52}$, 6 nm
First dielectric layer: $SiO_2$—$In_2O_3$—$ZrO_2$, 2 nm (A composition of $SiO_2$—$In_2O_3$—$ZrO_2$ is 15 mol % for $SiO_2$, 50 mol % for $In_2O_3$ and 35 mol % for $ZrO_2$.)
Second dielectric layer: $SiO_2$—$In_2O_3$—$ZrO_2$, 8 nm (A composition of $SiO_2$—$In_2O_3$—$ZrO_2$ is 15 mol % for $SiO_2$, 70 mol % for $In_2O_3$ and 15 mol % for $ZrO_2$.)
Reflecting layer: Ag alloy, 10 nm
Transmittance adjusting layer: $TiO_2$, 20 nm Subsequently, the substrate was conveyed into a spin coating apparatus from the second single sputtering apparatus, and an ultraviolet ray-curable resin was coated on this second information signal layer by a spin coating method and then cured upon irradiation with ultraviolet rays, thereby forming a cover layer having a thickness of 75 μm.

There was thus obtained a desired optical recording medium.

Example 2

An optical recording medium was obtained in the same manner as in Example 1, except for changing the inner diameter of the inner peripheral mask to 16 mm.

Example 3

An optical recording medium was obtained in the same manner as in Example 2, except for adjusting the dew point of the conveyance section of from the interlayer forming apparatus to the second single sputtering apparatus at −5° C.

Example 4

An optical recording medium was obtained in the same manner as in Example 1, except for adjusting the dew point of the conveyance section of from the interlayer forming apparatus to the second single sputtering apparatus at −15° C.

Comparative Example 1

An optical recording medium was obtained in the same manner as in Example 1, except for omitting the formation of a barrier layer on the back surface of the substrate.

Comparative Example 2

An optical recording medium was obtained in the same manner as in Example 1, except for changing the inner diameter of the inner peripheral mask to 40 mm.

(Degree of Vacuum)

As described previously, in the Examples and Comparative Examples, the thin film deposition of each layer was carried out using a single sputtering apparatus (DVD SPRINTER, manufactured by Oerlikon). The phase-change recording layer is subjected to thin film deposition in a seventh thin film deposition chamber among thirteen thin film deposition chambers. However, in the DVD SPRINTER, during the continuous operation, an argon gas for process or the like is introduced in a thin film deposition apparatus for actually undergoing the thin film deposition, and therefore, a degree of vacuum which becomes a base in a seventh vacuum chamber for the phase-change recording layer cannot be precisely measured. Then, a sixth thin film deposition chamber was not used for the thin film deposition, but a degree of vacuum of this vacuum chamber was measured in the following manner. That is, the steps until the transmittance adjusting layer, the reflecting layer, the second dielectric layer and the first dielectric layer were laminated in this order on the interlayer were carried out in the same manner as in each of the Examples and Comparative Examples. Subsequently, after the substrate was carried in the seventh vacuum chamber, only evacuation was carried out without undergoing charging of a process gas or the like and sputtering, and a degree of vacuum of the vacuum chamber was measured. The obtained results are shown in Table 1 and FIG. 9.

(Jitter after Rewriting of 1,000 Times)

The jitter after rewriting of 1,000 times of each of the thus obtained optical recording media of Examples 1 to 4 and Comparative Examples 1 and 2 was evaluated in the following manner.

Figure 13:
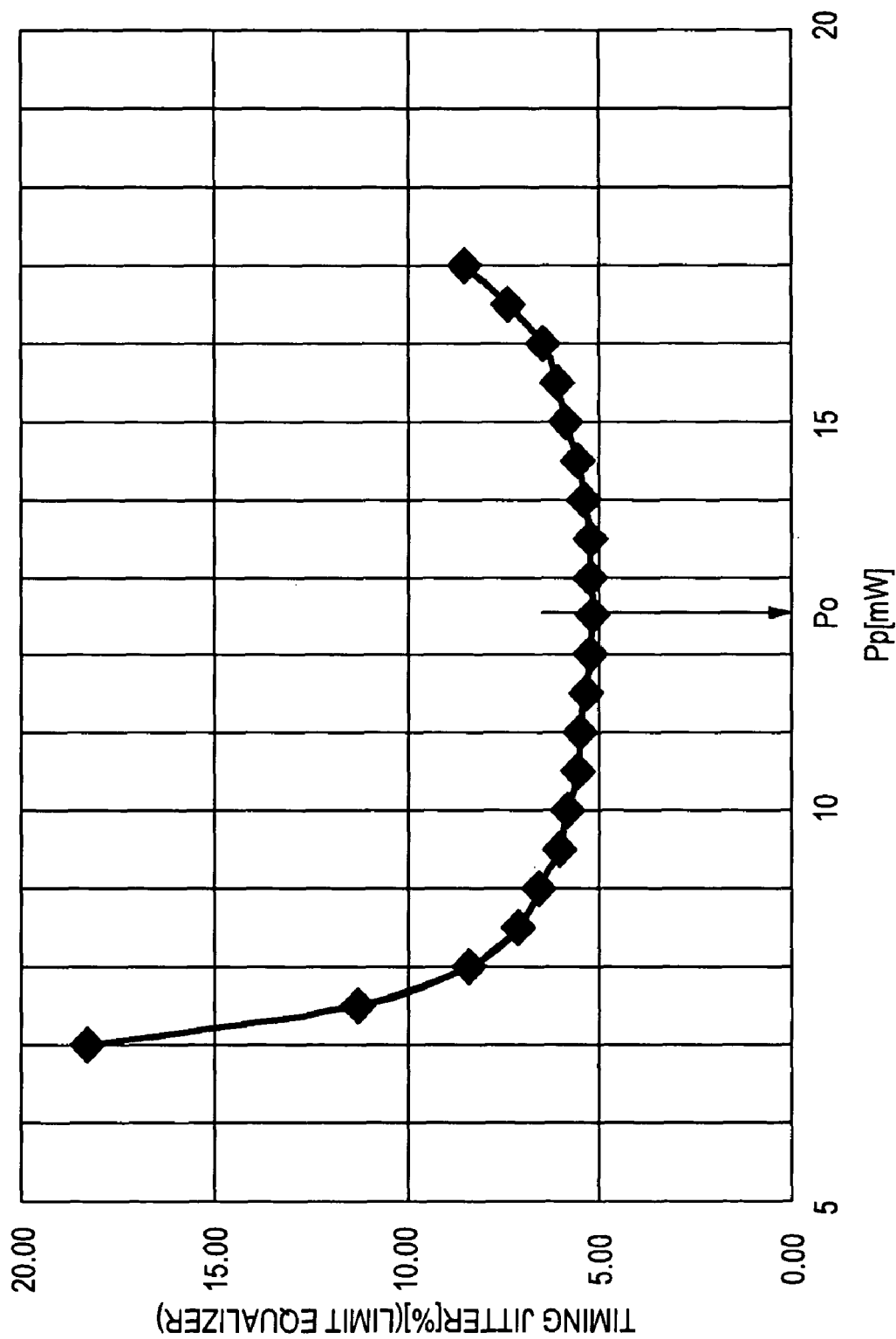
FIG. 13 is a graph showing a relation between a laser power $P_p$ and a timing jitter in each of optical recording media of Examples 1 to 4 and Comparative Examples 1 and 2.

ODU-1000 (manufactured by Pulstec Industrial Co., Ltd.) for Blu-ray disc evaluation including an objective lens of NA=0.85 and an optical system having a laser light wavelength of 405 nm was used as an evaluation machine. Each of the foregoing optical recording media was set in this evaluation machine and rotated at a linear rate of 9.834 m/s, a value of which is two times 4.917 m/s as a basic rate. Then, a timing jitter (hereinafter referred to simply as "jitter") using limit Eq. was measured by using an optimal N−1 light strategy while changing a recording power $P_p$ in a method in conformity with Blu-ray Disc Rewritable Format, Part 1: Basic Format Specifications Version 2.1. The obtained results are shown in FIG. 13. On that occasion, a recording power at which a minimum jitter is obtained is defined as $P_0$. Rewriting of 1,000 times was undergone in the same place at this recording power of $P_0$, and on that occasion, the jitter was measured after rewriting of 1, 2, 5, 10, 20, 50, 100, 200, 500 and 1,000 times, respectively.

Figure 10:
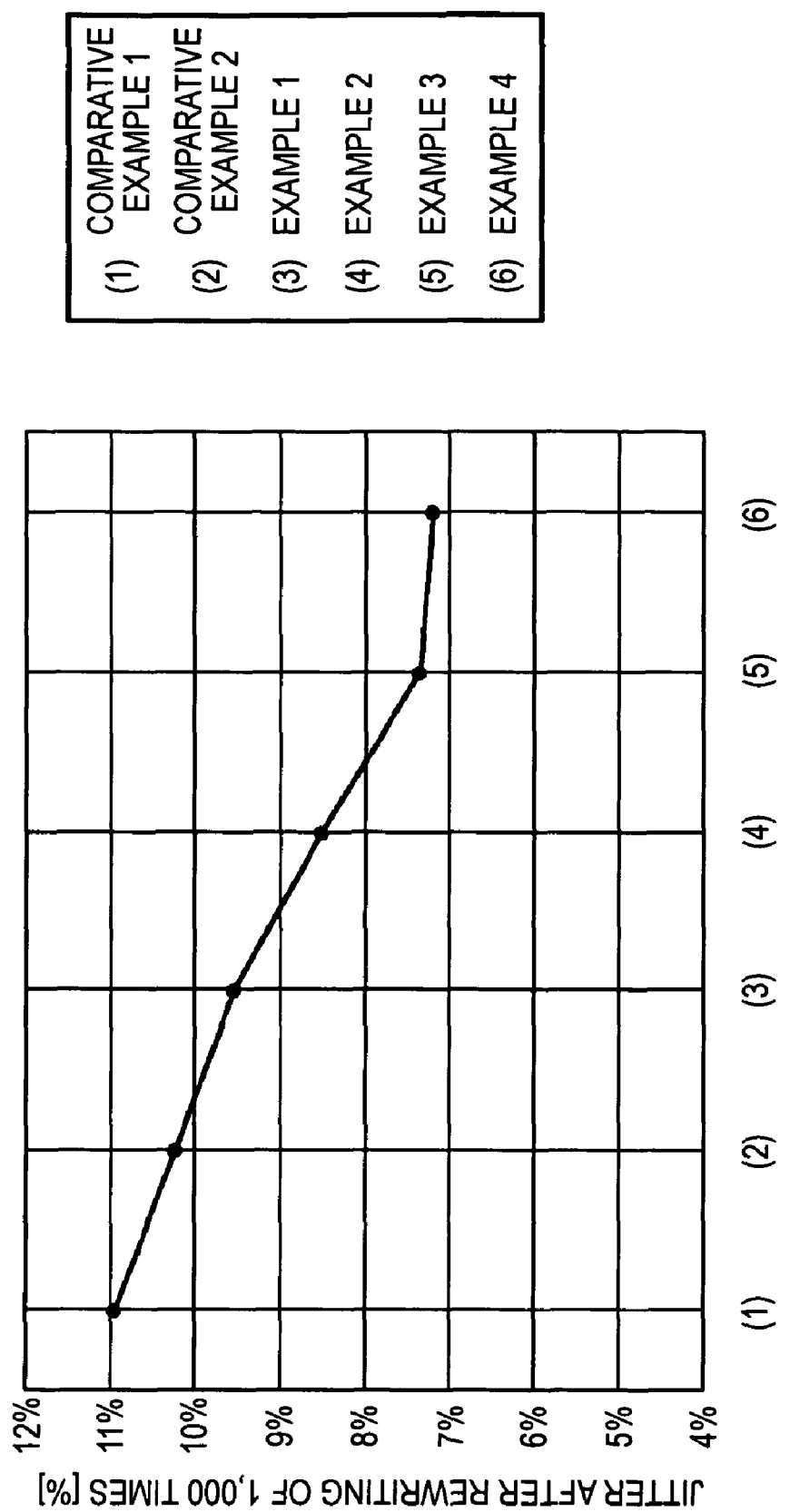
FIG. 10 is a graph showing a jitter after 1,000 times rewriting of each of optical recording media of Examples 1 to 4 and Comparative Examples 1 and 2.
Figure 12:
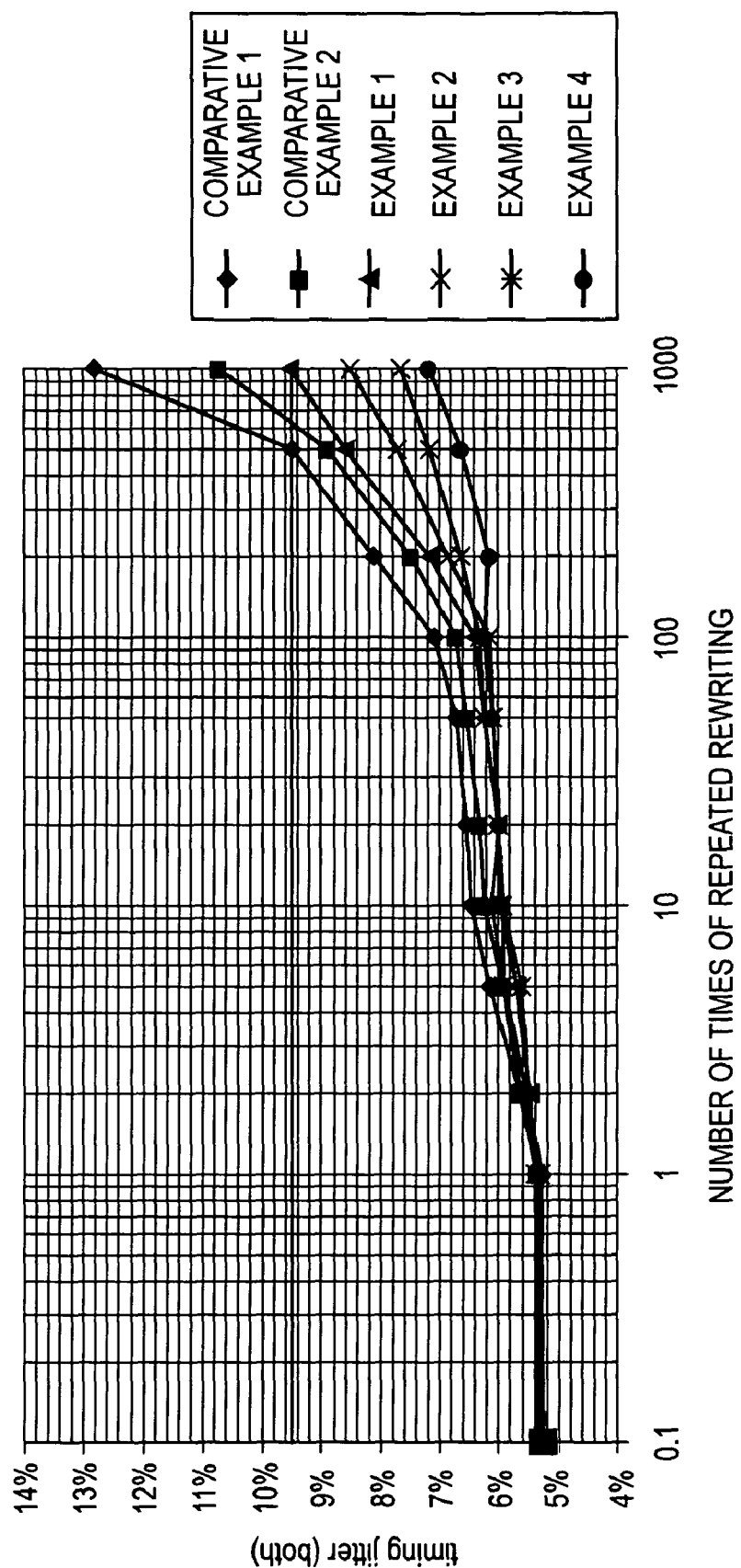
FIG. 12 is a graph showing a relation between the number of times of repeated rewriting and a timing jitter in each of optical recording media of Examples 1 to 4 and Comparative Examples 1 and 2.

The jitters after rewriting of 1, 2, 5, 10, 20, 50, 100, 200, 500 and 1,000 times, respectively are shown in FIG. 12, and the jitters after rewriting of 1,000 times are summarized and shown in Table 1 and FIG. 10.

Figure 9:
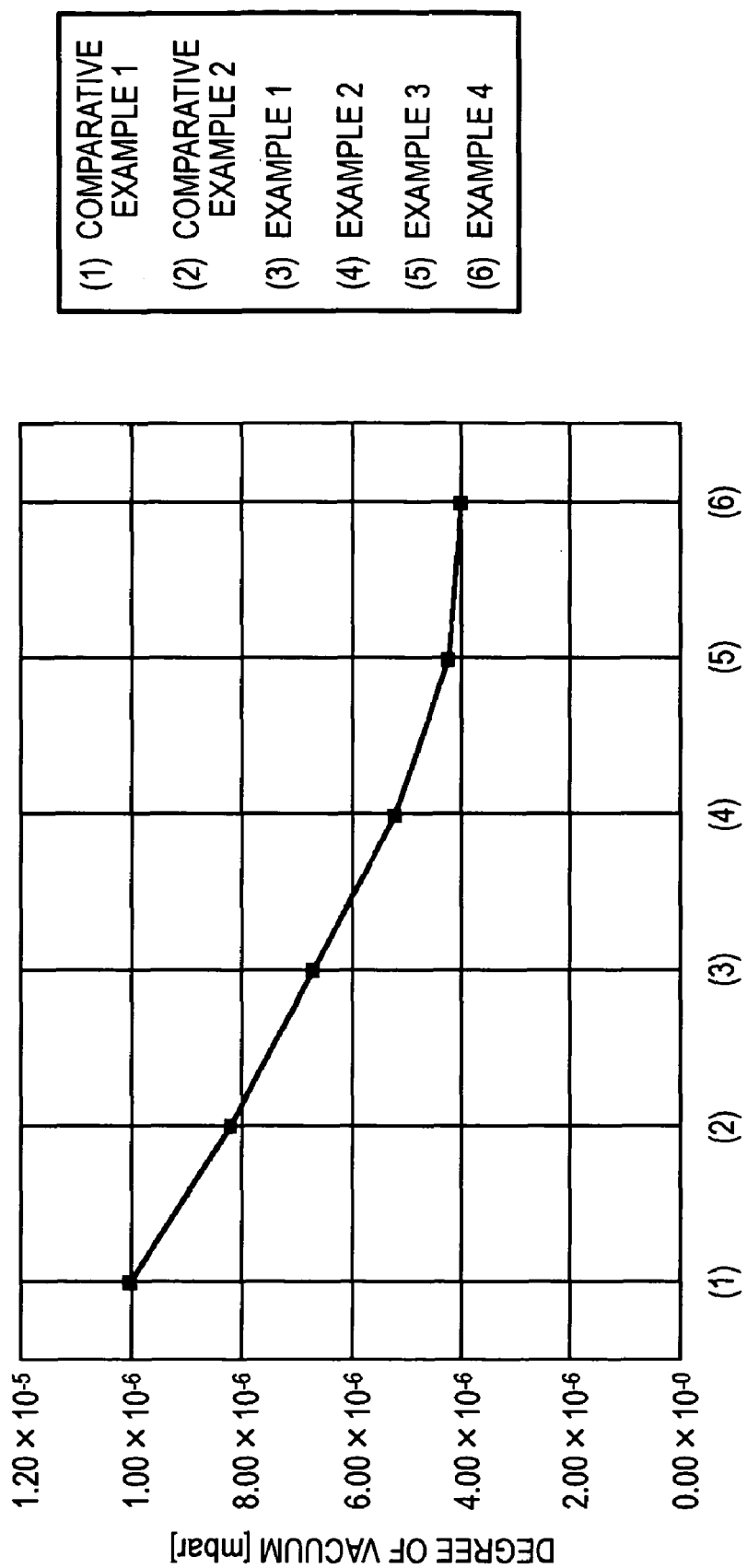
FIG. 9 is a graph showing a degree of vacuum of a vacuum chamber for undergoing thin film deposition of a phase-change recording layer of each of optical recording media of Examples 1 to 4 and Comparative Examples 1 and 2.
Figure 11:
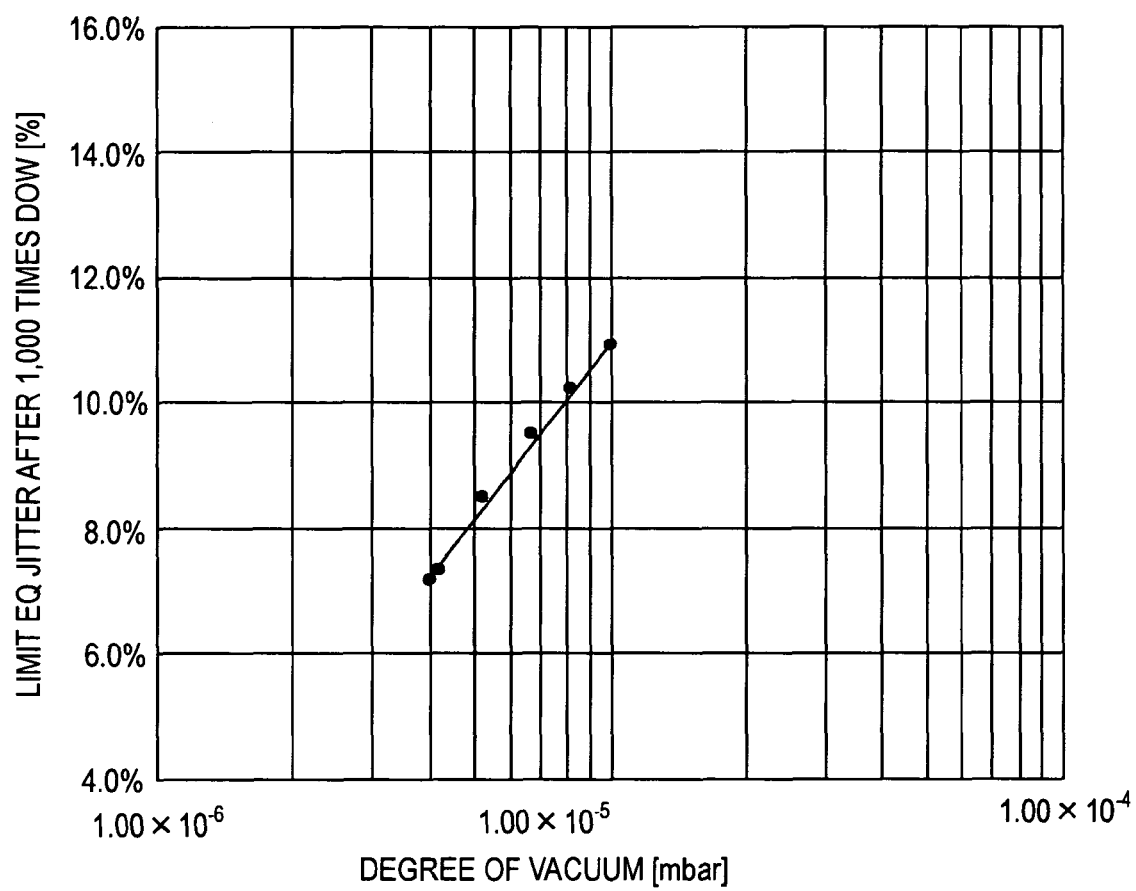
FIG. 11 is a graph showing a relation between a degree of vacuum and a limit EQ jitter after 1,000 times DOW at the time of forming a phase-change recording layer of each of optical recording media of Examples 1 to 4 and Comparative Examples 1 and 2.

Furthermore, a relation between the degree of vacuum as the base and the jitter is understood from FIGS. 9 and 10, and this is shown in FIG. 11.

Table 1 shows the evaluation results of the degree of vacuum and the jitter as well as a configuration of each of the barrier layers of Examples 1 to 4 and Comparative Examples 1 and 2.

TABLE 1

| | Moistureproof film | | | | | | |
|---|---|---|---|---|---|---|---|
| | | Size of thin film deposition mask | | | | Dew point of | Degree of |
| | Presence or absence | Outer diameter of inner peripheral mask [mm] | Inner diameter of outer peripheral mask [mm] | Exposed area [mm²] | Coverage [%] | conveyance environment [° C.] | vacuum of base [mbar] | Jitter [%] |
| Comparative Example 1 | No | — | — | 11133 | — | — | $1.00 \times 10^{-5}$ | 10.9 |
| Comparative Example 2 | Yes | φ40 | φ118 | 1453.8 | 86.9 | — | $8.20 \times 10^{-6}$ | 10.2 |
| Example 1 | Yes | φ25 | φ118 | 688 | 93.8 | — | $6.70 \times 10^{-6}$ | 9.5 |

TABLE 1-continued

|  | Moistureproof film | | | | | Dew point of conveyance environment [° C.] | Degree of vacuum of base [mbar] | Jitter [%] |
| --- | --- | --- | --- | --- | --- | --- | --- | --- |
| | Presence or absence | Size of thin film deposition mask | | | Coverage [%] | | | |
| | | Outer diameter of inner peripheral mask [mm] | Inner diameter of outer peripheral mask [mm] | Exposed area [mm$^2$] | | | | |
| Example 2 | Yes | φ16 | φ118 | 398.2 | 96.4 | — | $5.20 \times 10^{-6}$ | 8.5 |
| Example 3 | Yes | φ16 | φ118 | 398.2 | 96.4 | −5 | $4.20 \times 10^{-6}$ | 7.3 |
| Example 4 | Yes | φ16 | φ118 | 398.2 | 96.4 | −15 | $4.00 \times 10^{-6}$ | 7.2 |

Exposed area: An area of the back surface of the exposed substrate without being covered by the barrier layer
Coverage: An area of the back surface of the substrate covered by the barrier layer
Degree of vacuum of base: A degree of vacuum of the vacuum chamber during the formation of the phase-change recording layer
Jitter: A jitter after rewriting of 1,000 times (limit EQ jitter)

The following are understood from Table 1.

From the evaluation results of Examples 1 and 2 and Comparative Example 1, it is understood that by forming the barrier layer on the surface of the substrate, the degree of vacuum of the base during the formation of the phase-change recording layer is enhanced.

From the evaluation results of Examples 1 and 2 and Comparative Example 2, as the exposed area of the back surface of the substrate decreases, the degree of vacuum of the base during the formation of the phase-change recording layer is enhanced. Specifically, it is understood that by setting the exposed area to be not more than 688 mm$^2$, and preferably not more than 398.2 mm$^2$, the degree of vacuum of the base during the formation of the phase-change recording layer can be enhanced.

From the evaluation results of Examples 1 to 4, it is understood that by adjusting the dew point of the conveyance section of from the step of forming the interlayer to the step of forming the second information signal layer preferably at not higher than −5° C., and more preferably at not higher than −15° C., the degree of vacuum of the base can be more enhanced.

From the evaluation results of Examples 1 to 4 and Comparative Examples 1 and 2, it is understood that as the degree of vacuum of the base is enhanced, the jitter after rewriting of 1,000 times is enhanced. That is, the durability against repeated recording can be enhanced.

While the present invention has been specifically described with reference to the embodiments and working examples, it should not be construed that the present invention is limited to the foregoing embodiments and working examples, but various modifications can be made on the basis of the technical thought of the present invention.

For example, the configurations, methods, shapes, materials and numerical values, etc. mentioned in the foregoing embodiments and working examples are merely examples to the last, configurations, methods, shapes, materials and numerical values, etc. which are different therefrom may be used, if desired.

Also, the respective configurations of the foregoing embodiments can be combined with each other so far as the gist of the present invention is not deviated.

Also, in the foregoing embodiments and working examples, while the examples in which the present invention is applied to the optical recording medium having a single-layer or double-layer information signal layer have been described, it should not be construed that the present invention is limited to these examples, but the present invention is also applicable to an optical recording medium having a three-layer or multilayered information signal layer. In the case where the information signal layer is composed of three or more layers, an interlayer is formed between the respective information signal layers. Also, in the case where a first information signal layer (L0 layer), a second information signal layer (L1 layer), a third information signal layer (L2 layer), . . . , and an n-th information signal layer (Ln−1 layer) are provided on a substrate from the near side, it is preferable that a barrier layer is formed on the back surface of the substrate after molding the substrate but before forming the second information signal layer.

Also, in the foregoing embodiments and working examples, while the examples in which the present invention is applied to the optical recording medium in which recording or reproduction of information signals is undergone by irradiating laser light on the information signal layer from the side of the cover layer, it should not be construed that the present invention is limited to these examples. For example, the present invention is also applicable to an optical recording medium in which an information signal layer is provided on a substrate, and recording or reproduction of information signals is undergone by irradiating laser light from the side of the substrate. Also, the present invention is applicable to an optical recording method in which two sheets of substrates are stuck to each other, and recording or reproduction of information signals is undergone by irradiating laser light on an information signal layer between the substrates from the side of one of the substrates.

Also, in the foregoing embodiments and working examples, while the examples in which the two-layer dielectric layer composed of the first dielectric layer and the second dielectric layer is formed between the recording layer and the reflecting layer have been described, a three-layer or multi-layered dielectric layer may be formed between the recording layer and the reflecting layer. In the case where such a configuration is taken, it is preferable that a thermal conductivity of the three-layer or multilayered dielectric layer formed between the recording layer and the reflecting layer is made to increase successively from the recording layer toward the reflecting layer.

Also, in the foregoing embodiments, taking into consideration characteristics such as reliability, a dielectric layer, an interface layer or other layer may be further formed between the recording layer and the reflecting layer.

Also, in the foregoing embodiments and working examples, while the configuration in which in the second information signal layer, the thermal conductivity of the second dielectric layer located on the side of the reflecting layer is higher than the thermal conductivity of the first dielectric layer located on the side of the recording layer has been described, it should not be construed that the present invention is limited to this configuration. That is, there may be employed a configuration in which in the first information signal layer, a thermal conductivity of the second dielectric layer located on the side of the reflecting layer is higher than a thermal conductivity of the first dielectric layer located on the side of the recording layer.

Also, in the foregoing embodiments and working examples, while the present invention is applied to the rewritable optical recording medium, it should not be construed that the present invention is limited to this example, but the present invention is also applicable to an optical recording medium of a reproduction-only type or a write-once type.

In the foregoing embodiments and working examples, while the case where the step of forming the barrier layer is provided after the step of forming the first information signal layer but before the step of forming the interlayer has been described as an example, it should not be construed that the position of the step of forming the barrier layer is limited to this example. That is, the same effect can be obtained so far as the step of forming the barrier layer is provided after the step of molding the substrate but before the step of forming the second information signal layer. For example, the step of forming the barrier layer may be provided after the step of molding the substrate but before the step of forming the first information signal step, or after the step of forming the interlayer but before the step of forming the second information signal layer.

From the viewpoint of keeping well the degree of vacuum in each of the step of forming the first information signal layer and the step of forming the second information signal layer, it is preferable that the step of forming the barrier layer is provided after the step of molding the substrate but before the step of forming the first information signal layer. From the viewpoint of keeping well the degree of vacuum in the step of forming the second information signal layer, it is preferable that the step of forming the barrier layer is provided after the step of forming the first signal information signal layer but before the step of forming the interlayer, or after the step of forming the interlayer but before the step of forming the second information signal layer.

Also, in the case where the step of forming the barrier layer is provided after the step of forming the interlayer but before the step of forming the second information signal layer, for example, it is preferable to adjust the dew point of the conveyance section in the following manner. That is, it is desirable that the dew point of the conveyance section of from the step of forming the interlayer to the step of forming the barrier layer and/or the conveyance section of from the step of forming the barrier layer to the step of forming the second information signal layer is adjusted preferably at not higher than −5° C., and more preferably at not higher than −15° C.

Also, in the foregoing embodiments and working examples, while the case of using the phase-change recording layer as the recording layer has been described as an example, it should not be construed that the recording layer is limited to this example. Any recording layer is useful so far as it is able to repeatedly record information signals upon irradiation with laser light.

The present application contains subject matter related to that disclosed in Japanese Priority Patent Application JP 2009-120427 filed in the Japan Patent Office on May 18, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical recording medium comprising:
a substrate having a first principal surface and a second principal surface;
a first information signal layer on the first principal surface of the substrate configured to record or reproduce information signals upon irradiation with light; and
a barrier layer on the second principal surface of the substrate that suppresses the release of gas from the second principal surface of the substrate,
wherein the barrier layer is structured to expose a region of the second principal surface of the substrate, and
wherein an area of the region is less than or equal to 6.2% of the second principal surface of the substrate.

2. The optical recording medium according to claim 1, wherein the area is less than or equal to 398.2 mm$^2$.

3. The optical recording medium according to claim 1, wherein the barrier layer includes a dielectric material.

4. The optical recording medium according to claim 1, further comprising a second information signal layer, the first information signal layer being between the second information signal layer and the first principal surface of the substrate; and
wherein the second information signal layer contains bismuth, germanium and tellurium.

5. The optical recording medium according to claim 1, further comprising a second information signal layer,
wherein an interlayer containing a resin material is included between the first and second information signal layers.

6. The optical recording medium according to claim 1, wherein
the substrate contains a resin material having water absorption properties.

7. A method for manufacturing an optical recording medium comprising the steps of:
molding a substrate having a first principal surface and a second principal surface;
forming a first information signal layer on the first principal surface of the substrate;
forming an interlayer on the first information signal layer;
forming a second information signal layer on the interlayer; and
forming a barrier layer that suppresses the release of gas from the second principal surface of the substrate on the second principal surface of the substrate after molding the substrate and before forming the second information signal layer,
wherein forming the barrier layer includes forming a region that exposes the second principal surface of the substrate, and
wherein an area of the region is less than or equal to 6.2% of the second principal surface of the substrate.

8. The method for manufacturing an optical recording medium according to claim 7, further comprising:
conveying the substrate into a conveyance section after forming the interlayer and before forming the second information signal layer, and
wherein a dew point of the conveyance section is less than or equal to −5° C.

9. The method for manufacturing an optical recording medium according to claim 8, wherein the dew point of the conveyance section is less than or equal to −15° C.

10. The optical recording medium according to claim 1, wherein the area is a sum of an innerperipheral area and an outer peripheral area.

11. The method for manufacturing an optical recording medium according to claim 7, wherein the area is a sum of an inner peripheral area and an outer peripheral area.

12. The optical recording medium according to claim 1, wherein the area of the region is less than or equal to 13.6% of the second principal surface of the substrate.

13. The optical recording medium according to claim 1, wherein 6.2% of the second principal surface is less than or equal to 688 mm$^2$.

14. The optical recording medium according to claim 10, wherein the barrier layer is an intermediary circular ring structured to expose the region of the second principal surface of the substrate, the exposed region composed of an inner circular ring and an outer circular ring.

15. The method for manufacturing an optical recording medium according to claim 7, wherein the area of the region is less than or equal to 13.6% of the second principal surface of the substrate.

16. The method for manufacturing an optical recording medium according to claim 7, wherein 6.2% of the second principal surface is less than or equal to 688 mm$^2$.

17. The method for manufacturing an optical recording medium according to claim 11, wherein forming the barrier layer includes forming an intermediary circular ring exposing a region of the second principal surface of the substrate, the exposed region composed of an inner circular ring and an outer circular ring.

18. An optical recording medium comprising:
a substrate having a first principal surface and a second principal surface;
a first information signal layer on the first principal surface of the substrate configured to record or reproduce information signals upon irradiation with light; and
a barrier layer on the second principal surface of the substrate that suppresses the release of gas from the second principal surface of the substrate,
wherein the barrier layer is an intermediary circular ring structured to expose a region of the second principal surface of the substrate composed of an inner circular ring and an outer circular ring, and
wherein an area of the region is a sum of an area of the inner circular ring plus an area of the outer circular ring that is less than or equal to 6.2% of the second principal surface of the substrate.

19. The optical recording medium according to claim 18, further comprising:
a second information signal layer, the first information signal layer being between the second information signal layer and the first principal surface of the substrate; and
an interlayer including a resin material is included between the first and second information signal layers.

20. The optical recording medium according to claim 19, further comprising:
a cover layer on the second information layer.

* * * * *